S. GABRIEL, G. F. ROELING AND J. H. F. WEBERT.
GAS METER SEAL.
APPLICATION FILED AUG. 27, 1919.
1,365,477.
Patented Jan. 11, 1921.
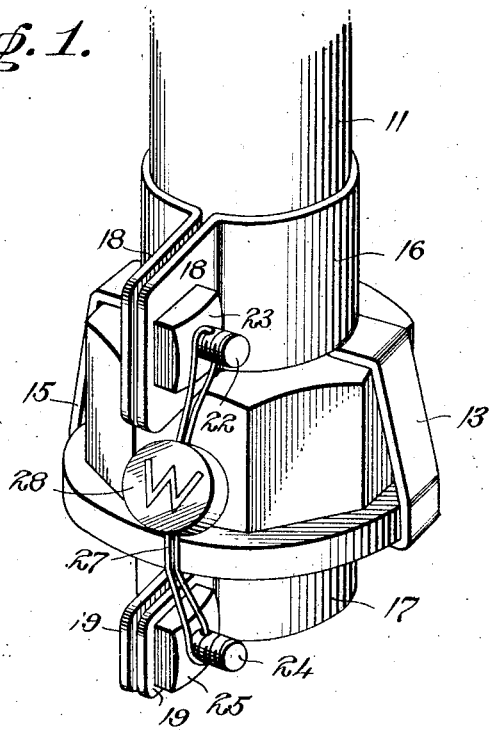
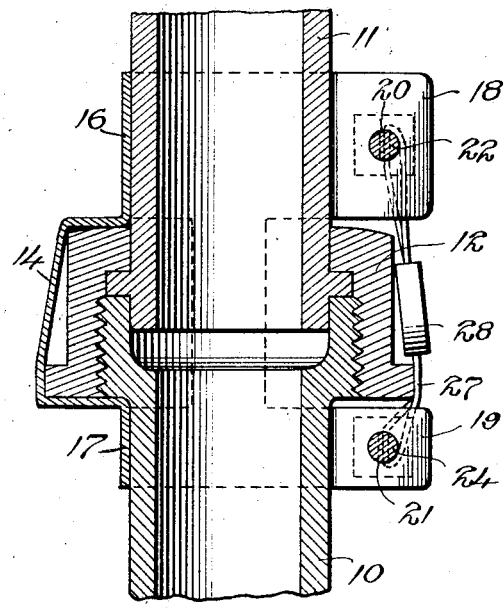
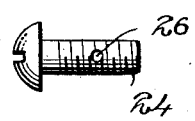
Inventor
Salvadore Gabriel,
George F. Roeling,
J. H. F. Webert,
By Henry T. Bright
Attorney

UNITED STATES PATENT OFFICE.

SALVADORE GABRIEL, GEORGE F. ROELING, AND JOHN H. F. WEBERT, OF NEW ORLEANS, LOUISIANA.

GAS-METER SEAL.

1,365,477. Specification of Letters Patent. Patented Jan. 11, 1921.

Application filed August 27, 1919. Serial No. 320,253.

*To all whom it may concern:*

Be it known that we, SALVADORE GABRIEL, GEORGE F. ROELING, and JOHN H. F. WEBERT, citizens of the United States, residing at New Orleans, in the parish of Orleans, State of Louisiana, have invented certain new and useful Improvements in Gas-Meter Seals; and we do hereby declare the following to be a full, clear, and exact description of the invention, such as will enable those skilled in the art to which it appertains to make and use the same.

Our invention relates to a pipe union or coupling seal and particularly to a seal of this character adapted for use in connection with the joints of the inlet and outlet pipes of a gas meter.

It is our purpose to produce an efficient seal of the character named which will be of simple, durable, cheap, compact and light construction and which can be easily and quickly applied to or removed from operative position.

In devices of this character it has been customary to secure the upper and lower ears of the cage member together by passing the seal wire therethrough. This operation is somewhat prolonged and in addition it does not force the ears of the cage together sufficiently to compactly apply the device over the pipe joint. It is therefore one of the particular objects of our invention to provide means for holding the ears of the cage tightly together and for facilitating the application of the seal wire.

With the above and other purposes in view our invention consists in the details of construction and in the arrangement and combination of parts to be hereinafter more fully described and particularly pointed out in the appended claim.

In describing our invention in detail reference will be had to the accompanying drawing wherein like characters of reference denote corresponding parts in the several views, and in which, Figure 1 is a perspective view of a pipe joint showing our improved seal applied;

Fig. 2, a vertical longitudinal section of what is shown in Fig. 1; and

Fig. 3, a detail view of one of the locking screws employed in the device.

Referring particularly to the drawings, 10 and 11 indicate pipe sections secured together by nut or union 12, release of which latter our improved seal is designed to prevent.

In carrying out our invention we preferably take a sheet of thin copper or other suitable material and stamp it to form spaced strips 13, 14 and 15 disposed centrally of the blank and mutually connected at their upper and lower ends respectively by continuous strips 16 and 17. The ends of the strip 16 are extended to form ears 18, while the ends of the strip 17 are extended to form ears 19. The ears 18 are provided with openings 20 adapted to register with each other when the device is applied in a manner to be hereinafter referred to. Likewise the ears 19 are provided with openings 21 adapted to register when the device is operatively applied.

In applying the cage about the joint of the pipe sections 10 and 11 the strip 16 is forced in circumscribing relation to the section 11 and the strip 17 in circumscribing relation to the section 10, which operation will dispose the strips 13, 14 and 15 across the top and bottom and along the side of the nut or coupling 12. The ears 18 and 19 are then positioned radially of respective pipe sections 11 and 10. To complete the sealing of the pipe joint we pass through the openings 20 of the ears 18 a screw 22 and engage thereon a nut 23, through the manipulation of which latter the ears 18 are forced toward each other and the strip 16 tightly applied to the pipe section 11. The ears 19 are likewise forced together by engaging a screw 24 through the openings 21 and applying a nut 25 thereto. The screws 22 and 24 are respectively provided with transversed passages 26 so positioned that they are just uncovered when the nuts 23 and 25 are correctly applied. The sealing is then completed by passing a seal wire 27 through the openings 26 and securing the ends thereof together by a sealing button 28 at a point between the screws 22 and 24 and at the same time securing the sealing button to the other reach of the wire 27 at a point between said screws. By directly securing the cage about the pipe joint by means of the screws and nuts previously described and then sealing the nuts against unscrewing a tighter and more compact application of the cage is had than in those constructions where the sealing wire is passed through the ears of the cage. Furthermore, by securing both ends of the wire 27 together and the other reach of said wire by the sealing button at a point between the screws 22 and 24 it will be apparent that in order to entirely remove the cage and thereby gain complete access to the union it will be necessary to sever the wire at two points which would render it extremely difficult to restore the seal in a manner that would indicate that it had not previously been tampered with.

We claim:

A coupling seal for a pipe joint comprising a pair of bands adapted to respectively encircle the connected pipe sections, a plurality of strips connecting said bands and within which the angular portion of the coupling lies, abutting perforated ears carried by each band, screws engaged through the perforations of abutting ears for clamping the bands on respective pipe sections, a single sealing wire engaged through perforations in the screws to prevent unlocking rotation of the nuts, and a sealing button securing the ends of the wire together and secured to the other reach of said wire at a point between said screws.

In testimony whereof we affix our signatures in the presence of two witnesses.

SALVADORE GABRIEL.
GEORGE F. ROELING.
JOHN H. F. WEBERT.

Witnesses:
L. FRED AUDRY,
ROBERT V. CONWA.